US011049163B2

(12) United States Patent
Kim et al.

(10) Patent No.: US 11,049,163 B2
(45) Date of Patent: Jun. 29, 2021

(54) METHOD, DEVICE AND COMPUTER PROGRAM FOR PROVIDING IMAGE SEARCH INFORMATION

(71) Applicant: ODD CONCEPTS INC., Seoul (KR)

(72) Inventors: Jung Tae Kim, Seoul (KR); Kyung Mo Koo, Seoul (KR)

(73) Assignee: ODD CONCEPTS INC., Seoul (KR)

( * ) Notice: Subject to any disclaimer, the term of this patent is extended or adjusted under 35 U.S.C. 154(b) by 63 days.

(21) Appl. No.: 16/329,762

(22) PCT Filed: Aug. 24, 2017

(86) PCT No.: PCT/KR2017/009250
§ 371 (c)(1),
(2) Date: Feb. 28, 2019

(87) PCT Pub. No.: WO2018/043990
PCT Pub. Date: Mar. 8, 2018

(65) Prior Publication Data
US 2019/0244270 A1    Aug. 8, 2019

(30) Foreign Application Priority Data

Aug. 29, 2016   (KR) .................. 10-2016-0109941

(51) Int. Cl.
*G06Q 30/00*    (2012.01)
*G06Q 30/06*    (2012.01)
(Continued)

(52) U.S. Cl.
CPC ......... *G06Q 30/0625* (2013.01); *G06F 16/00* (2019.01); *G06F 16/338* (2019.01);
(Continued)

(58) Field of Classification Search
CPC ................................................ G06Q 30/0625
See application file for complete search history.

(56) References Cited

U.S. PATENT DOCUMENTS 9,313,359 B1 *    4/2016   Stojancic ............. H04N 21/439
2013/0013578 A1 *  1/2013   Yang ................... G06F 16/5838
                                                              707/706
(Continued)

FOREIGN PATENT DOCUMENTS

JP    2009-135573 A    6/2009
JP    2010-74518 A     4/2010
(Continued)

OTHER PUBLICATIONS

Sivic, Josef, and Andrew Zisserman. "Video Google: Efficient visual search of videos." Toward category-level object recognition. Springer, Berlin, Heidelberg, 2006. 127-144.*
(Continued)

*Primary Examiner* — Kathleen Palavecino
(74) *Attorney, Agent, or Firm* — Adsero IP (57) ABSTRACT

The present invention relates to a method, device and computer program for providing image search information. The method for an electronic device to provide image search information according to the present invention comprises: a step of generating a query by using an image if a predetermined query generation event occurs while playing the image; a step of transmitting the query to a server; and a step of receiving a search result corresponding to the query from the server and displaying same on a screen, wherein the search result is a search result of at least one object included in the image. A purpose of the invention is to provide a method, device and program for providing image search information, allowing the search of a product similar to a product exposed in an image, without an additional input of a search word.

11 Claims, 5 Drawing Sheets

(51) Int. Cl.
  *G06F 16/338* (2019.01)
  *G06F 16/33* (2019.01)
  *G06F 16/00* (2019.01)
  *G06T 7/73* (2017.01)
  *G06F 16/738* (2019.01)
  *G06F 16/783* (2019.01)
  *G06F 16/732* (2019.01)
  *G06F 16/735* (2019.01)

(52) U.S. Cl.
  CPC ........ *G06F 16/3331* (2019.01); *G06F 16/732* (2019.01); *G06F 16/735* (2019.01); *G06F 16/738* (2019.01); *G06F 16/7837* (2019.01); *G06T 7/74* (2017.01); *G06T 2207/10016* (2013.01); *G06T 2207/20081* (2013.01)

(56) References Cited

U.S. PATENT DOCUMENTS

| | | | | |
|---|---|---|---|---|
| 2014/0255003 A1* | 9/2014 | Abramson | .......... | G06F 16/7834 386/240 |
| 2015/0120707 A1* | 4/2015 | Ahsan | ................ | G06F 16/5838 707/722 |
| 2017/0026707 A1* | 1/2017 | Yoo | ....................... | G06F 16/951 |
| 2018/0176633 A1* | 6/2018 | Yeo | ....................... | G06N 20/00 |

FOREIGN PATENT DOCUMENTS

| | | |
|---|---|---|
| JP | 2014016882 A | 1/2014 |
| KR | 20020060376 A | 7/2002 |
| KR | 20120128511 A | 11/2012 |
| KR | 101289085 B1 | 7/2013 |
| KR | 20160017817 A | 2/2016 |
| WO | 2014119959 A1 | 8/2014 |
| WO | 2015/104083 | 7/2015 |

OTHER PUBLICATIONS

International Search Report dated Nov. 15, 2017 in related PCT/KR2017/009250 in 2 pages.

Office Action for Japanese Patent Application No. 2019-511857, dated Feb. 21, 2020, with English translation, 10 pages.

Office Action for Japanese Patent Application No. 2019-511857, dated Nov. 24, 2020, with English translation, 8 pages.

* cited by examiner

METHOD, DEVICE AND COMPUTER PROGRAM FOR PROVIDING IMAGE SEARCH INFORMATION

This application is a U.S. National Stage of PCT/KR2017/009250 filed Aug. 24, 2017, which claims the priority benefit of Korean Patent Application No. 10-2016-0109941, filed on Aug. 29, 2016 in the Korean Intellectual Property Office.

TECHNICAL FIELD

The present disclosure relates to a method, an apparatus, and a computer program for providing image search information through an image reproduction device, and more particularly to a method, an apparatus, and a computer program for recognizing an object in an image and providing product information similar thereto without input of a separate search word.

BACKGROUND ART

Online business transactions such as marketing and trade have been vitalized against a backdrop of recently expanded wired/wireless Internet environments. In connection with this, while purchasers browse through magazines, blogs, or videos in YouTube through a desktop or a mobile terminal connected to the Internet and find enjoyable products, the purchasers then search for product names and purchase the products. Examples of this can be seen in cases where a name of a bag carried by a famous actress in an airport, or a name of a baby product shown in an entertainment show attains a high rank in a real-time search listing of a portal site. However, at this time, a user should open a separate webpage to conduct a search and search for a product name and a store, and if the user does not know the name, the user cannot easily search for the product, which inconveniences the user.

Meanwhile, sellers frequently sponsor video content such as soap operas or movies to promote products. However, even though the sellers pay an expense for promotion, product names may not be directly exposed due to an issue of indirect advertisements in most cases.

Accordingly, these days, sellers seek various promotion methods to create video content including video frames tagged with product information for promotion to allow users to see the product information shown in a video while the video is reproduced. However, according to such methods, the user may identify only limited information provided by the seller (product information tagged to content by the seller) and thus, if a product which the user wants in the video is not a sponsored product, there is still difficulty in searching for information on the product. Further, if the product shown in the video is too expensive to purchase, consumers may want to search for similar products which are cheaper. However, it is not easy to specify a name of the product which the user has identified in the video and it is difficult to search for similar products.

DETAILED DESCRIPTION OF THE INVENTION

Technical Problem

The present disclosure has been made to solve the problems and an aspect thereof is to provide a method, an apparatus, and a program for providing video search information which can search for products similar to a product shown in a video without any search words.

Another aspect of the present disclosure is to provide a method and an apparatus for providing video search information which can reduce a cost spent on product advertisements and more effectively promote products by exposing product information while a video is reproduced without separately manufacturing content tagged with product information.

Technical Solution

In accordance with an aspect of the present disclosure, a method of providing video search information by an electronic device is provided. The method includes: when a preset query generation event is made during reproduction of a video, generating a query using the video; transmitting the query to a server; and receiving a search result corresponding to the query from the server and displaying the search result on a screen, wherein the search result is a search result including product information or advertisement information of one or more objects included in the video.

In accordance with another aspect of the present disclosure, an electronic device is provided. The electronic device includes: a controller configured to generate a query using a video when a preset query generation event is made during reproduction of a video; a communication unit configured to transmit the query to a server and receive a search result corresponding to the query from the server; and a display unit configured to display the received search result on a screen, wherein the search result is a search result of a predetermined object included in the video.

In accordance with another aspect of the present disclosure, a method of providing video search information to a client by a server is provided. The method includes: generating a product database including image feature information of a predetermined product and a label corresponding to the image feature information of the product; receiving a query generated using a video from the client; analyzing the query; when the query includes an object to be searched for, to which a label is attached, based on a result of the analysis of the query, searching for product information corresponding to the label attached to the object to be searched for or image feature information of the object to be searched for in the product database; and transmitting the search result to the client.

In accordance with another aspect of the present disclosure, a server for providing video search information to a client is provided. The server includes: a database unit configured to generate and store a product database including image feature information of a predetermined product and a label corresponding to the image feature information of the product; a communication unit configured to receive a query generated using a video from the client and transmit a search result of the query to the client; and a controller configured to analyze the received query, search for product information corresponding to a label of an object included in the query or image feature information of the object in the database unit, and provide the product information as the search result.

Advantageous Effects

According to the present disclosure, it is possible to search for products similar to a product shown in a video without any search words.

According to the present disclosure, it is possible to reduce a cost spent on product advertisements and more effectively promote products by exposing product information while a video is reproduced without separately creating content tagged with product information.

MODE FOR CARRYING OUT THE INVENTION

The aforementioned objectives, features, and advantages will be described in detail with reference to the accompanying drawings and, accordingly, the technical idea of the present disclosure can be easily implemented by those skilled in the art. In the description of the present disclosure, when it is determined that a specific description of known technologies related to the present disclosure obscures the substance of the present disclosure, the detailed description thereof will be omitted. Hereinafter, exemplary embodiments of the present disclosure will be described in detail with reference to the accompanying drawings. In the drawings, the same reference numeral is used to indicate the same or similar elements, and all combinations described in the specification and claims may be made in a predetermined way. Unless defined otherwise, it may be understood that the singular form may imply one or more and the singular expression includes the plural expression.

In the specification, an "object" may be understood as a thing or an image of the thing which can be recognized as a product, and may be an image of an unspecific thing including noise according to an object extraction condition or an image of a specific thing corresponding to a predefined label. The "object" may correspond to a product in a comprehensive range according to a classification depth of a learned label, but should be understood as a concept which may correspond to detailed characteristics of a product such as a product color, a product pattern, and a product name.

The "label" in the specification is information defining the characteristics of the product (or object) as described above and may include, for example, large category information such as women's clothing, men's clothing, furniture, household items, and kitchen supplies, medium category information such as top, bottom, and (one-piece) dress, and small category information such as color, pattern, brand, and price. This is only an example and the label may be classified or defined variously according to user settings. The label according to an embodiment of the present disclosure may be learned through machine learning and a label corresponding to image feature information may be pre-stored in a server or a client (electronic device).

In the specification, an "electronic device" may reproduce a video of a desktop, a smart phone, and a tablet PC and include all types of electronic devices capable of displaying search information, and may be understood as the same meaning as a device for providing video search information. Further, the electronic device may include a control device such as a set-top box capable of transmitting video content to a display device through transmission/reception of the video content and reproducing a video or displaying search information through the display device.

Figure 1:
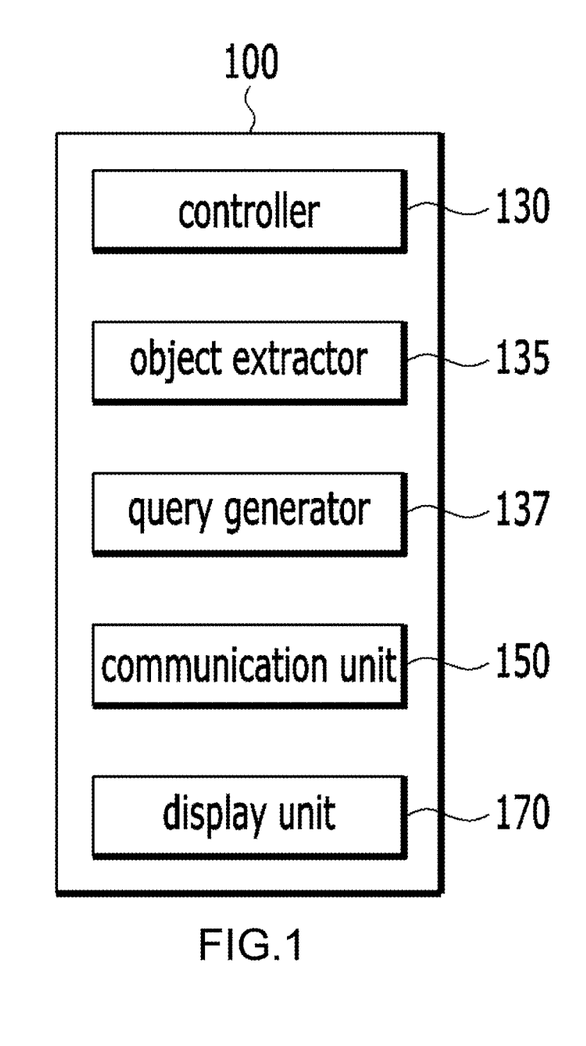
FIG. 1 is a conceptual diagram illustrating an embodiment of an electronic device for providing video search information according to the present disclosure.

FIG. 1 is a conceptual diagram illustrating an embodiment of an electronic device providing video search information according to the present disclosure. Referring to FIG. 1, an electronic device 100 according to the present disclosure may include a controller 130, a communication unit 150, and a display unit 170, and may further display an input unit 190 (not shown). The electronic device 100 according to the present disclosure may include only the controller 130, the communication unit 150, and the input unit 190, and the electronic device may transmit video information to an external display device without including the display unit 170.

When a preset query generation event is made during video reproduction, the controller 130 generates a query on the basis of the video.

When a preset time passes or a search event is generated after a pause event is generated during the video reproduction, the controller 130 may determine that the query generation event is made. For example, when a user pauses the reproduced video and the video is continuously paused after a predetermined time (2 seconds) passes, the electronic device 100 may determine that the query generation event is made and generate a query on the basis of a paused video frame.

When the electronic device 100 can be controlled through a voice command, the controller 130 may determine that the query generation event is made if a preset time passes or a search event is generated after a voice control mode activation command is received during the video reproduction. For example, when the controller 130 is a set-top box and an activation command of a preset voice recognition application such as "hi, *" or "hello, *" is input through a microphone, the controller 130 may activate a voice control mode and control the electronic device 100 and elements thereof according to a voice command received thereafter. In this case, the controller 130 according to an embodiment of the present disclosure may capture a video of a screen while switching to the voice control mode. When a user command including a search request keyword such as "search" or "find" is input in the voice control mode through a microphone (when a search event is generated), the controller 130 may determine that a query generation event is made and generate and transmit a query including at least one piece of object information extracted from a captured screen or a video frame, an image of one area included in the captured screen, a plurality of video frames satisfying a preset condition based on the captured screen, or one frame of the video. In this example, the voice control mode may be understood to mean a mode in which the electronic device analyzes a received voice by activating a voice dictation and executes the analyzed voice command.

The search event is an event which can be recognized as searching for a product by the electronic device 100 and may include, for example, an action of the user clicking or touching a search button displayed after pausing, an action of the user designating one area of a video frame, or an action of the user clicking or touching one area or a button recognized as an object in a video frame.

Further, when a pause event is generated during the video reproduction, the controller 130 may display the time remaining to generate the query on the screen, and when there is no user input before the remaining time reaches 0, may determine that the query generation event is made.

When the query generation event is made, the query generated by the controller 130 may include at least one of a paused video frame, an image of one area included in a video frame, a plurality of video frames satisfying a preset condition based on a paused screen, or object information extracted from one video frame included in a video. The object information may include at least one piece of image feature information extracted from a video, image feature information extracted from a predetermined object area, learned image feature information corresponding to a specific object, or label information.

When the input unit 190 includes a module capable of receiving a voice command such as a microphone, the search event may be a user command including a search request keyword as described above in the embodiment or an input thereof.

In addition, when the communication unit 150 includes a communication module capable of receiving a user command input through an external input device such as a Bluetooth reception device or an infrared reception device, a user search command received through a remote control or a terminal application may be the search event. This is because the electronic device 100 may recognize reception of a search command through the input device as a search for a product.

The image feature information is information locally or globally extracted from a video, a video frame, or an image of one area included in the video. The image feature information may be used for machine learning to generate a label. When there is a pre-learned label, predetermined image feature information may correspond to a specific label or a specific object.

The image feature information may include vector information (descriptor) of a whole image, an object area, or an image (image segment or patch) in a preset range located near a feature point within the image, and the vector information may include information on a brightness change, a color, a pattern (frequency or distribution of a vertical edge and a horizontal edge), a slope of an image segment, and a brightness change larger than or equal to a preset threshold. Further, the image feature information may have not only a unique range value for each object but also a unique range value for each label according to a learning model.

Figure 8:
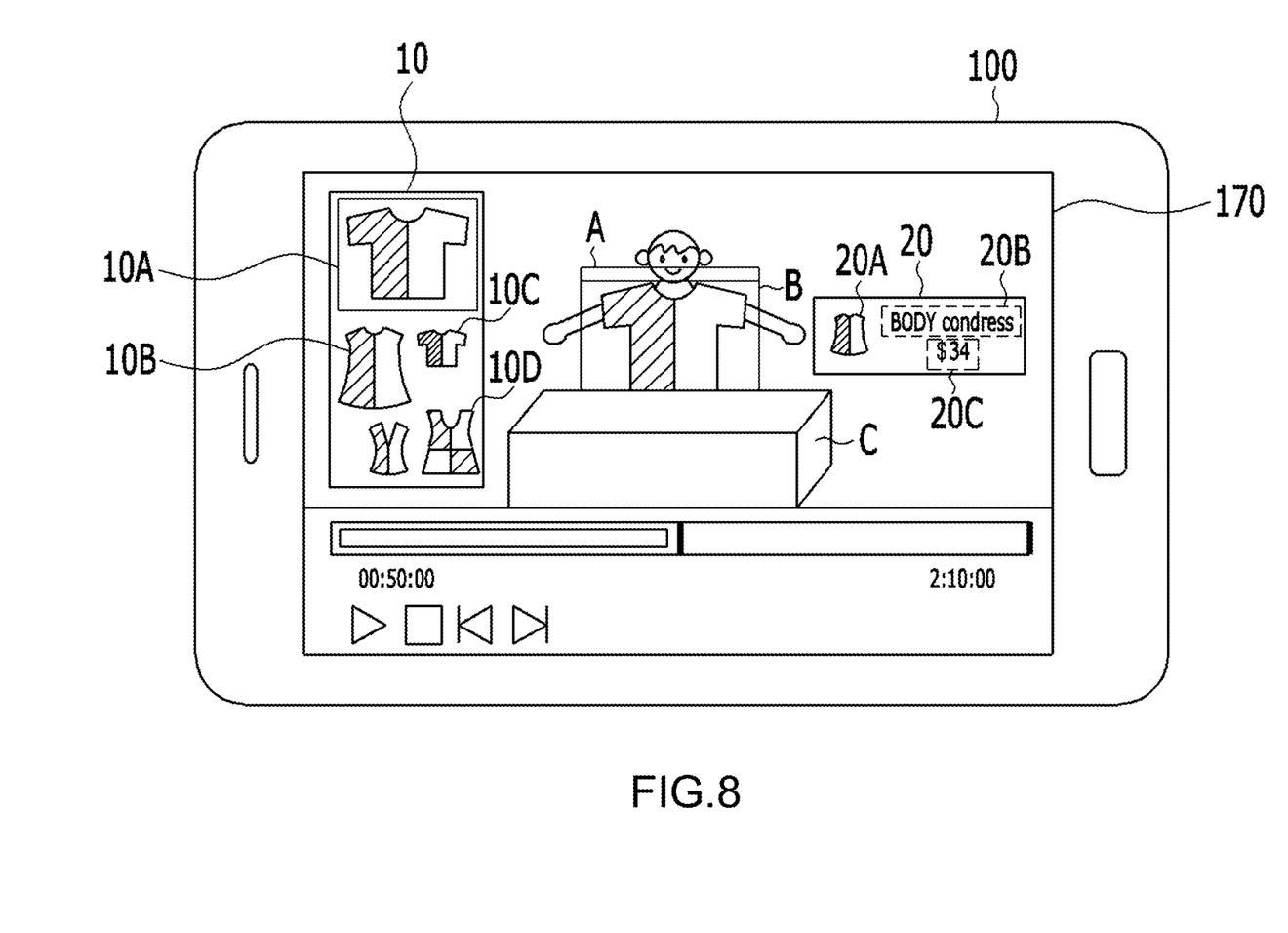
FIG. 8 illustrates an embodiment in which an electronic device provides video search information according to the present disclosure.

The image of one area included in the video frame may be designated as a polygon B as illustrated in FIG. 8. When the pause event is generated, the controller 130 may provide one area including A recognized as an object as a guide for user convenience, and at this time the user may finally select an area included in a query by controlling the size or shape of the polygon provided as the guide.

Further, when the paused video frame is a blurred frame, it is difficult to detect an object, or in order to increase object extraction accuracy in the server, the controller 130 may insert one or more video frames satisfying a preset condition based on the paused video frame into the query.

The preset condition to select one or more video frames included in the query may be configured using a time, a number of frames, the presence or absence of subtitles, and/or a degree of definition. For example, the controller 130 may generate video frames within 1 second before/after the paused video frame as one query according to the preset condition. Further, the controller 130 may generate three video frames as one query by adding video frames before/after the paused video frame one by one. According to another embodiment, when the degree of definition of the paused video frame is low, the controller 130 may search for a video frame having a high degree of definition in the video frames before/after the paused video frame and insert the found video frame into the query. In another example, when subtitles are included in the paused video, the controller 130 may insert only a video frame from which the subtitles are removed into the query.

The controller 130 may include an object extractor 135 for extracting an object from the video frame and a query generator 137 for generating a query including an object.

The object extractor 135 may extract one area including learned image feature information corresponding to a specific object as an object through a pre-stored leaning model and attach a label corresponding to the image feature information to the corresponding object. The object in the present embodiment may be an object which can be defined as a specific object and may be defined variously according to a label or range thereof.

The image feature information learned to correspond to the specific object using the pre-stored learning model may be a global descriptor or a local descriptor according to settings thereof. That is, the object extractor 135 may extract an object including image feature information learned to correspond to a vehicle from the video frame or an object including image feature information learned to correspond to clothing, and may not only identify which type of object the corresponding object is but also classify characteristics of the object (product type, product brand, color, material, form, pattern, partial design difference, and feelings which can be defined by humans—cute, chic, vintage, and the like—). Accordingly, it is possible to label a more detailed product name or characteristics of the product by using the global or local descriptor suitable for purposes.

According to another embodiment, the object extractor 135 may extract image feature information from the video frame, partition one area within the video frame according to a preset condition on the basis of the extracted feature information, and configure the partitioned area as an object to be searched for. The object extracted by the electronic device according to the present disclosure may be determined as a predetermined "object" regardless of object type and thus may be extracted at a high speed but may include noise. Area partition may be performed using image feature information within the video frame such as a brightness change point, overall color distribution, edge information, and definition information, and object configuration may be performed using coordinate information on the video frame. A plurality of objects may be included in the video frame in which case the plurality of objects are extracted.

When the display unit 170 displays a search result, the controller 130 may perform control to preferentially display, on a screen, a search result of an object including a label which is the same as or similar to an object which the user has found using a user's search log. This is to increase a probability of the video search resulting in product purchase and increase user satisfaction by preferentially exposing the search result belonging to a field of interest of the user on the screen. Further, the controller 130 may control the display unit 170 to display search results on the screen in an order of search results having high similarity to image feature information of the object included in the query, thereby increasing search accuracy.

The communication unit 150 transmits a query to a server 200 and receives a search result corresponding to the query from the server 200. The communication unit 150 may include a wired/wireless communication module for communication with the server 200, for example, a mobile communication module supporting GSM, CDMA, WCDMA, HSDPA, and LTE. Further, the communication unit 150 may include a wireless communication module such as WLAN, Wi-Fi, Direct, DLNA, Wibro, and Wimax such as a communication module for short range communication, for example, a communication module supporting Bluetooth, RFID, infrared communication, UWB, ZigBee, NFC, Wi-Fi, and Wi-Fi Direct. For reference, if the communication unit 150 according to the present disclosure is a communication module supporting data transmission and reception to and from the server 200, the communication unit 150 is not limited by a scheme thereof.

The display unit 170 displays a received search result on the screen, and the search result is a search result of a predetermined object included in the video. The search result may include product information or advertisement information found through the query. The display unit may display (output) information processed by the electronic device 100 and may display an execution screen information of an application executed in the electronic device 100 or User Interface (UI) or Graphic User Interface (GUI) information according to the execution screen information.

The display unit 170 may include a display module, and the display module may include a touch screen having a mutual layer structure with a touch sensor or integrated with the touch sensor. The touch screen may function as the input unit 190 (not shown) for providing an input interface between the electronic device 100 and the user and also provide an interface for displaying information between the electronic device 100 and the user. Further, the display module may be a stereoscopic display module for displaying a stereoscopic video. The stereoscopic display may use a three-dimensional display scheme such as a stereoscopic scheme (glasses type), an auto stereoscopic scheme (non-glasses type), and a projection scheme (holographic type). The display unit 170 according to the present disclosure is not limited by the type of display module and may include any display module capable of displaying a moving picture by all types of video reproduction programs which can reproduce videos and displaying a search result of a query.

The display unit 170 does not mean only an element coupled to the electronic device 100 in hardware but may be a separate display module connected to the controller 130 wirelessly or through a wire to transmit and receive a video and a control signal.

Figure 2:
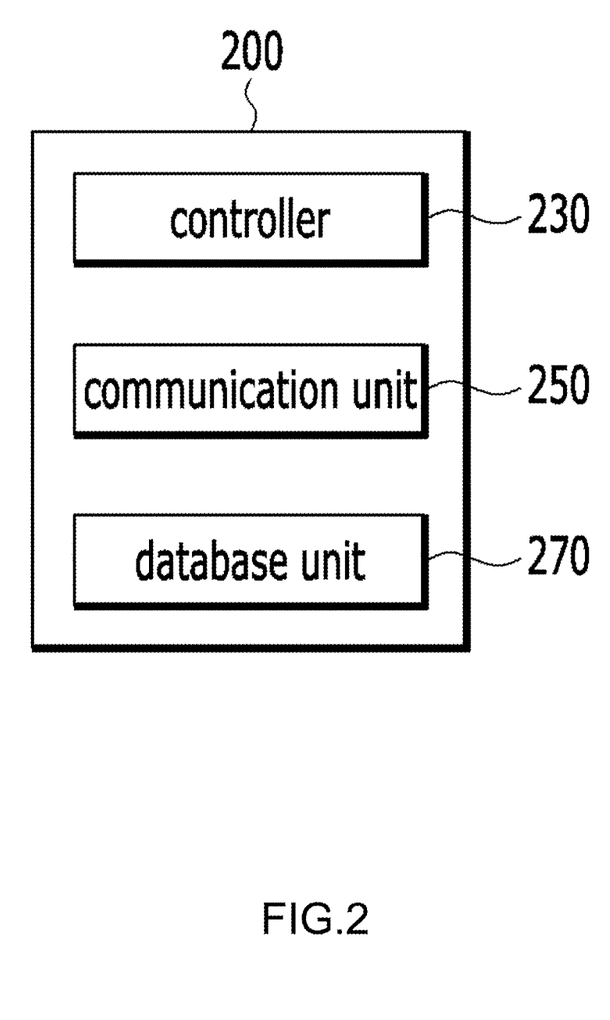
FIG. 2 is a conceptual diagram illustrating an embodiment of a server for providing video search information by a client according to the present disclosure.

FIG. 2 is a conceptual diagram illustrating an embodiment of a server for providing video search information to a client according to the present disclosure.

Referring to FIG. 2, the server 200 according to an embodiment of the present disclosure may include a controller 230, a communication unit 250, and a database unit 270.

The controller 230 analyzes a query received from the client 100, searches for product information corresponding to a label of an object included in the query or image feature information of the object in the database unit 270, and provides the found product information as a search result.

When the query includes image feature information classified as noise or label information learned as noise, the controller 230 may exclude the corresponding query or the object from a target to be searched for.

Further, when the query includes a video frame, an image of one area included in the video frame, or a first object to which no label is attached on the basis of the query analysis result, the controller 230 may extract image feature information from the video frame, the image, or the first object. The first object is an object to which no label is attached and which is recognized as a thing by the electronic device regardless of the product type, and the image may be an image in one area captured or cropped by the electronic device.

When the video frame, the image, or the first object includes image feature information pre-learned as a specific object on the basis of the search result of the image feature information, the controller 230 may configure one area including the image feature information in the video frame, the image, or the first object as an object to be searched for and attach a label corresponding to the image feature information to the object to be searched for.

The controller 230 searches for a product having the same/similar label or the same/similar image feature information in the database unit 270 on the basis of the label of the object to be searched for or the image feature information.

When the query includes the object to be searched for, to which the label is attached, on the basis of the query analysis result of the controller 230, the controller 230 searches for product information corresponding to the label attached to the object to be searched for or image feature information of the object to be searched for in the database unit 270. The controller 230 controls the communication unit 250 to transmit the search result to the client.

When the communication unit 250 receives identification information of the user and a search log of the user from the client, the controller 230 may provide the user with product information corresponding to a label included in the search log through the communication unit 250 on the basis of the identification information and the search log received from the client. More specifically, the controller 230 may assign higher importance to the product information corresponding to the label included in the search log such that the product information is more preferentially exposed to the client.

The communication unit 250 receives the query generated using the video from the client and transmits the search result of the query to the client 100. Further, the communication unit 250 may receive both the identification information of the user and the search log of the user from the client. Since an example of a communication module included in the communication unit 250 is the same as the communication module included in the communication unit 150, a description thereof will be omitted.

The database unit 170 generates and stores a product database including image feature information of a predetermined product and a label corresponding to the product image feature information.

Hereinafter, an embodiment of a method of providing video search information according to the present disclosure will be described with reference to FIGS. 3 to 6.

Figure 3:
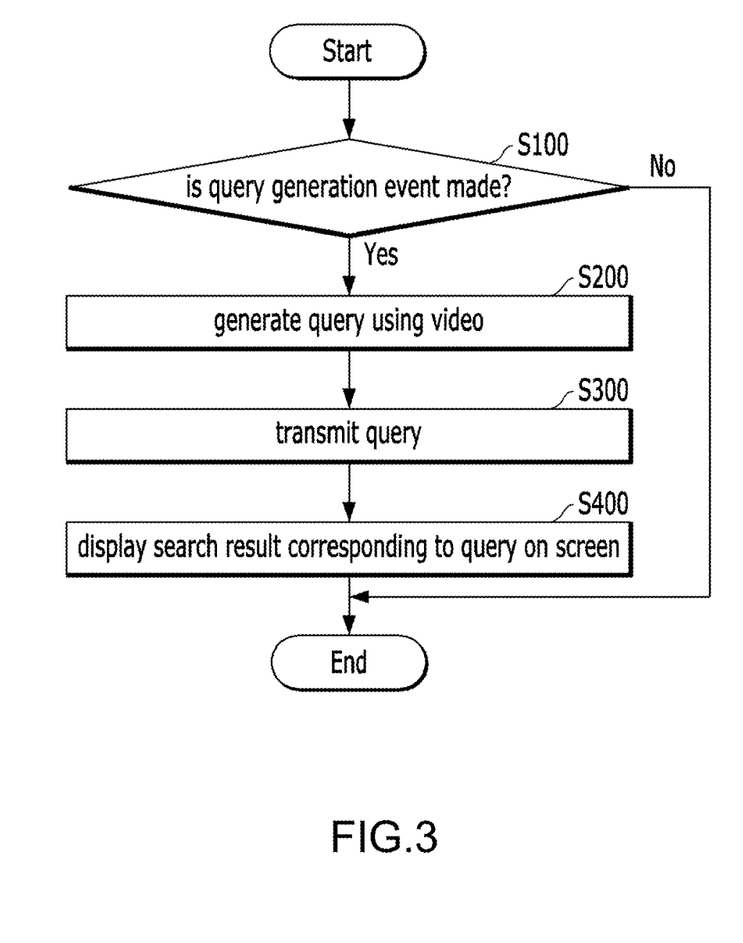
FIG. 3 is a flowchart illustrating an embodiment of a method of providing video search information by an electronic device according to the present disclosure.

First, referring to FIG. 3, according to a method of providing video search information according to the present disclosure, when a preset query generation event is made during video reproduction in S100, the electronic device generates a query using the video in S200 and transmits the query to the server in S300. The query generated in S200 may include object information extracted from at least one piece of object information extracted from a video frame (a video frame which is being reproduced or a paused video frame) displayed on the screen, an image in an area included in the video frame, a plurality of video frames which satisfy a preset condition based on the reproduced or paused screen, or an image frame included in the video. The object information may include at least one piece of image feature information extracted from the video, image feature information extracted from a predetermined object area, image feature information learned to correspond to a specific object, or label information.

When a preset time passes or a search event is generated after a pause event is generated during video reproduction, the electronic device according to the present disclosure may determine that the query generation event is generated in S100.

Further, when the pause event is generated during video reproduction, the electronic device according to the present disclosure may display the time remaining to generate the query on the screen, and when there is no user input before the remaining time reaches 0, may determine that the query generation event is made in S100.

The query generation event may vary depending on settings. When the electronic device includes an input module such as a microphone, if the electronic device may be activated through a voice command or a voice control mode of the electronic device is activated during video reproduction, the electronic device may automatically capture a video frame displayed on the screen. When a preset time passes or a search event is generated such as reception of a search command in the activated state, the electronic device may determine that the query generation event is made in S100. In this example, the voice control mode may be understood to mean a mode in which the electronic device analyzes a received voice by activating a voice dictation and executes the analyzed voice command.

Subsequently, the electronic device receives a search result corresponding to the query from the server in S400 and displays the received search result on the screen in S500 so as to provide video search information. In S500 of displaying the received search result on the screen, the electronic device may preferentially display the search result of an object including a label which is the same as or similar to the object for which the user has searched using the search log of the user. This is to increase a probability of the video search resulting in product purchase and increase user satisfaction by preferentially exposing the search result belonging to a field of interest of the user on the screen of the electronic device. Further, in S500, the electronic device may increase accuracy of the search by displaying the search result in an order of higher similarity with image feature information of the object included in the query.

Figure 4:
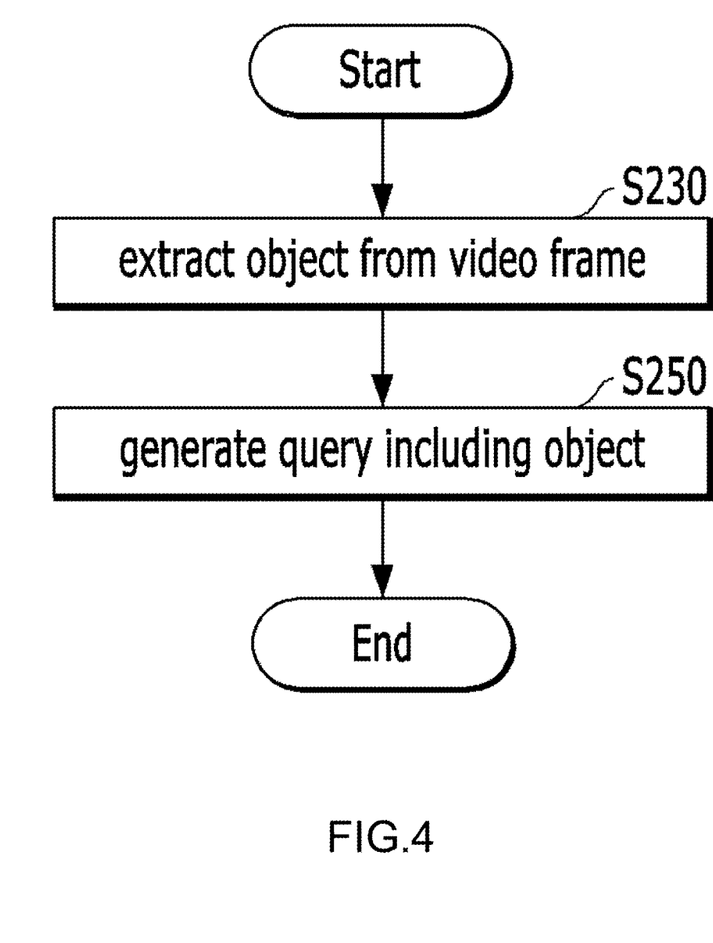
FIG. 4 is a flowchart illustrating an embodiment of a method of generating a query according to the present disclosure.

The query generation step S200 using the video may be performed through a process of extracting an object from a video frame in S230 and generating a query including the object in S250 as illustrated in FIG. 4.

Figure 5:
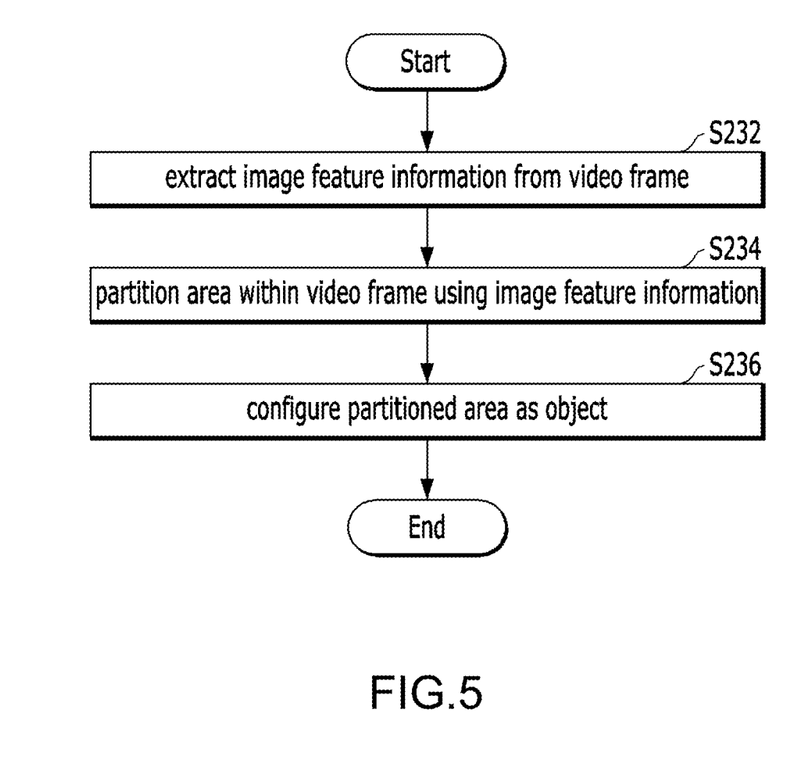
FIG. 5 is a flowchart illustrating an embodiment of a method of extracting an object according to the present disclosure.

Referring to FIG. 5, in the object extraction step S230, the electronic device may extract image feature information from the video frame in S232, partition one area within the video frame according to a preset condition on the basis of the extracted feature image in S234, and configure the partitioned area as an object to be searched for in S236.

Area partition in S234 may be performed using image feature information within the video frame such as a brightness change point, overall color distribution, edge information, and definition information, and object configuration in S236 may be performed using coordinate information on the video frame. A plurality of objects may be included in the video frame in which case the plurality of objects are extracted.

Figure 6:
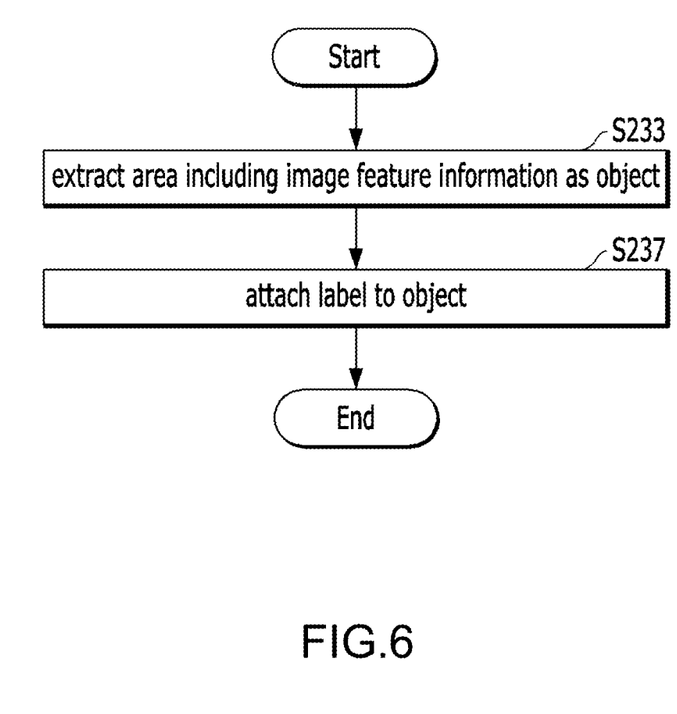
FIG. 6 is a flowchart illustrating an embodiment of a method of extracting an object according to the present disclosure.

According to another embodiment of the object extraction in S230, the object extraction in S230 may be performed by extracting an area including image feature information learned to correspond to a specific object as an object to be searched for on the basis of a pre-stored learning model in S233 and attaching label corresponding to the image feature information to the object to be searched for in S237 as illustrated in FIG. 6.

Figure 7:
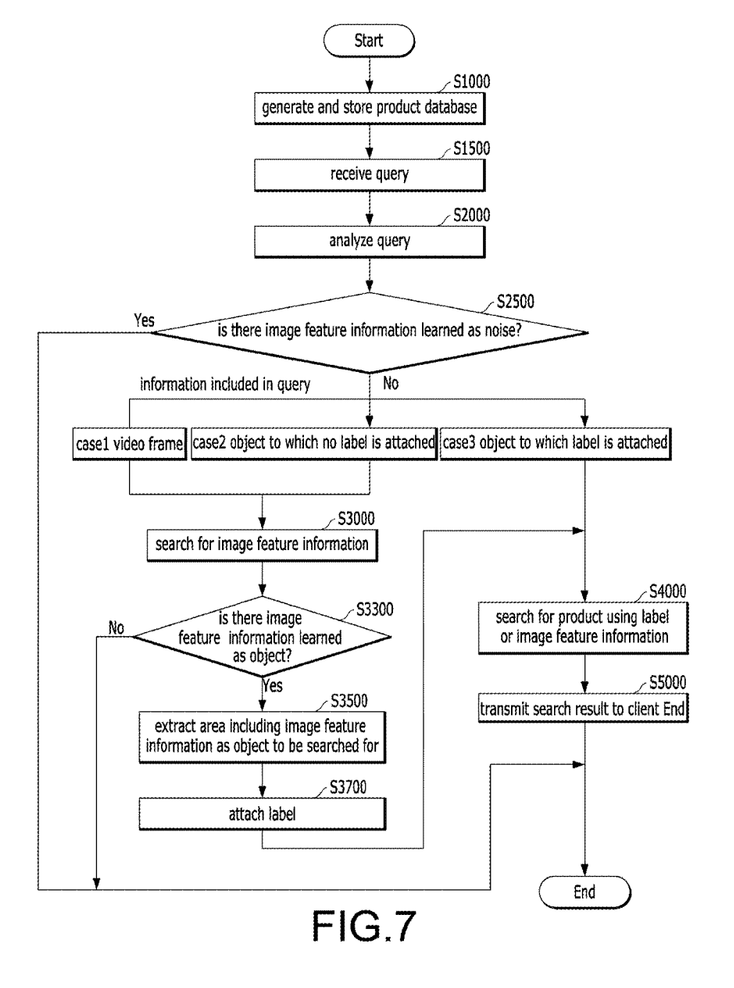
FIG. 7 is a flowchart illustrating an embodiment of a method of providing video search information by a server according to the present disclosure.

FIG. 7 is a flowchart illustrating an embodiment of a method of providing video search information by a server according to the present disclosure. Referring to FIG. 7, the server according to the present disclosure generates a product database including image feature information of a predetermined product and a label corresponding to the image feature information of the product.

Upon receiving a query generated using a video from a client in S1000, the server may analyze the query in S2000, determine whether the query includes image feature information learned as noise in S2500, and when the query includes the image feature information, exclude the corresponding query from targets to be searched for.

When the query includes a video frame (case 1), an image (not shown) in one area included in the video frame, or a first object to which no label is attached (case 2) on the basis of the result of query analysis in S2000, the server searches for image feature information pre-learned as a specific object in the video frame, the image, or the first object in S3000. On the basis of the result of the search in S3000, the server extracts, as an object to be searched for, one area including the image feature information from the video frame, the image, or the first object in S3500. Subsequently, the server attaches a label corresponding to the image feature information to the object to be searched for in S3700. Further, the server searches for a product having the same/similar label or the same/similar image feature information in the product database on the basis of the label of the object to be searched for or the image feature information in S4000.

When the query includes the object to be searched for, to which the label is attached (case 3), on the basis of the result of query analysis in S2000, the server searches for product information corresponding to the label attached to the object to be searched for or image feature information of the object to be searched for in the product database in S4000. Then, the server transmits the search result to the client in S5000.

Although not illustrated in drawings, the server may receive identification information of the user and the search log of the user from the client. In this case, in the search result transmission step S5000, the server may provide the user with product information corresponding to the label included in the search log on the basis of the identification information and the search log received from the client. The server may assign higher importance to the product information and transmit the product information to the client such that the product information is more preferentially exposed to the client.

FIG. 8 illustrates an embodiment of a method of providing video search information by the electronic device according to the present disclosure. In FIG. 8, the user reproduces a video through the electronic device 100. As one example, in a video, a woman is wearing a T-shirt (A) and a user pauses the video intending to search for product information of the T-shirt (A). When there is no user input for 2 seconds after a pause event is generated, a query generation event is made by a preset algorithm.

The electronic device 100 generates a query on the basis of the paused video frame according to the made query generation event. The electronic device 100 may transmit the video frame itself to the server or may transmit an image in an area included in the video frame to the server. Further, the electronic device may extract an object from one video frame included in the video and transmit the extracted object information to the server.

It is assumed that, when the pause event is generated, the electronic device is configured to show a rectangular guide (B) to allow the user to designate an area. The user may select the T-shirt (A) by adjusting the size and shape of the guide (B), or may designate, as an object, a table (C) which the electronic device 100 has not recognized as an object but in which the user is interested.

In the embodiment in which the electronic device 100 recognizes the action of clicking or touching the guide area (B) by the user as the query generation event, the server 200 (not shown) performs a search using the guide area image (B). The server 200 receives a query including an image to which no separate label is attached from the electronic device 100 and identifies whether the image includes image feature information pre-learned as a specific object. When the image includes image feature information learned as noise, the server 200 stops a search for the corresponding image. However, since the image includes the T-shirt (A), the image includes image feature information learned as the T-shirt.

When the server 200 finds image feature information learned as the T-shirt (a descriptor corresponding to the T-shirt), the server 200 configures one area including the corresponding image feature information as an object to be searched for. The configured object to be searched for may have the form closest to the T-shirt (A) and may be an area obtained by excluding an area (background) which is irrelevant to the product from the initially received image (B).

Subsequently, the server 200 may attach labels such as women's clothing (large category), top (medium category), and blue and T-shirt (small category) to the object to be searched for. Further, the server may search for a product corresponding to a blue T-shirt among women's tops in the product database and may perform a search (image search) for a product including image feature information similar to the extracted image feature information in the product database. When the same and/or similar products 20A, 10A, 10B, 10C, and 10D are found on the basis of the search result, the server 200 transmits information on the same and/or similar products to the electronic device 100.

The electronic device 100 receives the search result from the server 200 and displays the same on the screen. At this time, the electronic device 100 may display product information in an area 10 of the screen, an area (B) which the user designates in the video frame, or an area 20 near the object (A). The product information may be displayed in the area 10 in a descending order or an ascending order according to similarity, interest based on the search log of the user, price, and popularity. For example, the electronic device 100 may display the product 10A having the highest similarity on the top and then display the products 10B and 10C in an order of high similarity.

Further, the electronic device may display a product name 20B, a product manufacturer, a price 20C, popularity, a category (label), store information (website, contacts, and location information), and relevant reviews together with the product image 20A and may be configured to execute another application when corresponding information is clicked or touched.

The present disclosure can be variously substituted, modified, and changed by those skilled in the art without departing from the technical scope of the present disclosure and thus is not limited by the embodiments and the accompanying drawings.

DRAWING LEGEND INSERTION

FIG. 1
130: controller
135: object extractor
137: query generator
150: communication unit
170: display unit
FIG. 2
230: controller
250: communication unit
270: database unit
FIG. 3
Start
S100: is query generation event made?
Yes
No
S200: generate query using video
S300: transmit query
S400: display search result corresponding to query on screen
End
FIG. 4
Start
S230: extract object from video frame
S250: generate query including object
End
FIG. 5
Start
S232: extract image feature information from video frame
S234: partition area within video frame using image feature information
S236: configure partitioned area as object
End
FIG. 6
Start
S233: extract area including image feature information as object
S237: attach label to object
End
FIG. 7
Start
S1000: generate and store product database
S1500: receive query
S2000: analyze query
S2500: is there image feature information learned as noise?
Yes
No
쿼리에 포함된 정보 : information included in query
Case1 영상 프레임 : case1 video frame
Case2 레이블 미부착 오브젝트 : case2 object to which no label is attached
Case3 레이블 부착 오브젝트 : case3 object to which label is attached
S3000: search for image feature information
S3300: is there image feature information learned as object S3500: extract area including image feature information as object to be searched for
S3700: attach label
S4000: search for product using label or image feature information
S5000: transmit search result to client
End

The invention claimed is:

1. A method of providing video search information by an electronic device, the method comprising:
   displaying a time remaining to generate a query on a screen when a pause event is detected during reproduction of a video; and
   determining that a first query generation event is made when there is no user input before the remaining time reaches 0;
   based on a determination that the first query generation event was made during reproduction of the video, generating the query using the video;
   transmitting the query to a server; and
   receiving a search result corresponding to the query from the server and displaying the search result on the screen,
   wherein the search result is a search result including product information or advertisement information of one or more objects included in the video.

2. The method of claim 1, wherein the query includes at least one piece of object information extracted from a video frame displayed on a screen, an image in one area included in the video frame, a plurality of video frames which satisfy a preset condition based on the screen, or one frame of the video.

3. The method of claim 2, wherein the object information includes at least one piece of image feature information extracted from the video or label information learned to correspond to a specific object.

4. The method of claim 1, wherein the generating of the query comprises determining that a second query generation event is made when a preset time passes or a search event is generated after a pause event is generated during the reproduction of the video.

5. The method of claim 1, wherein the generating of the query comprises determining that a second query generation event is made when a search event is generated during the reproduction of the video.

6. The method of claim 1, wherein the generating of the query comprises:
   capturing the video when a voice control mode activation command is received during the reproduction of the video; and
   generating the query using the captured image when a search event is generated in a voice control mode.

7. The method of claim 1, wherein the generating of the query comprises:
   extracting one or more objects from a video frame displayed on a paused screen; and
   generating a query including the one or more objects.

8. The method of claim 7, wherein the extracting of the objects comprises extracting one area including image feature information learned to correspond to a specific object through a pre-stored learning model as an object to be searched for and attaching a label corresponding to the image feature information to the object to be searched for.

9. The method of claim 7, wherein the extracting of the objects comprises:
   extracting image feature information from the video frame;
   partitioning one area within the video frame according to a preset reference using the extracted image feature information; and
   configuring the partitioned area as an object to be searched for.

10. The method of claim 1, wherein the displaying of the search result on the screen comprises preferentially displaying, on the screen, a search result of an object including a label which is equal or similar to that of an object for which a user has searched using a search log of the user.

11. A non-transitory computer-readable medium comprising instructions executable by the processor to:
    display a time remaining to generate a query on a screen when a pause event is detected during reproduction of a video;
    determine that a query generation event is made when there is no user input before the remaining time reaches 0;
    based on a determination that the query generation event was made during reproduction of the video, generate the query using the video;
    transmit the query to a server; and
    receive a search result corresponding to the query from the server and display the search result on the screen,
    wherein the search result is a search result including product information or advertisement information of one or more objects included in the video.

* * * * *